Dec. 30, 1924.
L. KORNELOW
POWER DRIVEN TRUCK
Filed Aug. 21, 1923
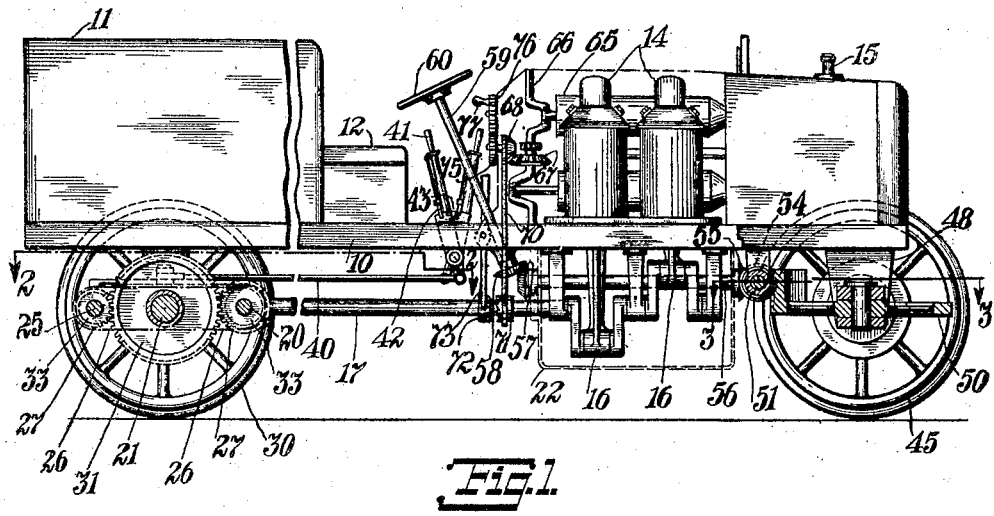
Inventor
Leon Kornelow Patented Dec. 30, 1924.

1,521,196

UNITED STATES PATENT OFFICE.

LEON KORNELOW, OF MARTINSBURG, NEW YORK.

POWER-DRIVEN TRUCK.

Application filed August 21, 1923. Serial No. 658,508.

*To all whom it may concern:*

Be it known that I, LEON KORNELOW, a citizen of Russia, residing at Martinsburg, in the county of Lewis and State of New York, have invented certain new and useful Improvements in Power-Driven Trucks, of which the following is a specification.

This invention relates to motor vehicles, being designed more particularly for application to motor trucks, the invention having for an object to provide a truck having novel propelling and steering means.

For further comprehension of the invention, and of the objects and advantages thereof, reference will be had to the following description and accompanying drawings, and to the appended claims in which the various novel features of the invention are more particularly set forth.

Fig. 1 of the drawings is a longitudinal sectional view of a motor truck having the invention applied thereto, this view being taken just inside the wheels.

Fig. 2 is a detail horizontal section taken on a plane just under the main frame members, and showing the drive means.

Fig. 3 is a similar view showing the steering means.

In the drawings the reference numeral 10 indicates one of the usual main side frame members which support the truck body 11, seat 12 and also the motor, and motor supply tank. The motor is indicated generally at 14 and is here driven by compressed air and comprises two cylinders, the air to the motor being supplied from a tank 15 mounted on the front of the frame.

The motor 14 drives, through the medium of the connecting rods 16, a longitudinal crank shaft 17 on the rear end of which is a bevel gear 18 meshing with a like gear 19 on a transverse shaft 20 extending in front of the rear axle 21. The forward end of the crank shaft may be enclosed in a crank case 22.

Located at the rear of the axle 21 are two short transverse shafts 25 which are driven from the shaft 20 by means of chains 26 looped over sprocket wheels 27 on the respective shafts. The rear axle is here shown as comprising a single member extending through a sleeve 28 mounted on the frame in any suitable manner.

On this rear axle are mounted, one just inside each wheel 30, a pair of spur gears 31 of different diameters which are engaged on their forward sides by spur pinions 32 on the ends of shaft 20. On their rear sides these gears 31 are engaged by pinions 33 on the outer ends of the shafts 25. The various pinions are of different diameters, as will be understood.

These pinions are loose on their respective shafts but are suitably held against axial movement therealong and are formed with clutch elements 35 adapted to be engaged by clutch sleeves 36 feathered on the said shafts. The clutch sleeves 36 are moved along the shafts by means of a pair of levers 37 fulcrumed between their ends as at 38 and engaging said clutch sleeves in any well known manner, each lever engaging a clutch sleeve on the front shaft and one of the rear shafts and moving the sleeves inversely in unison.

The levers are formed with integral arms 39 to which are connected links 40 which extend forwardly and are connected at their forward ends to hand levers 41 located adjacent the driver's seat 12, the levers being each provided with locking means whereby they can be locked in position with their connected clutch sleeves both disengaged, or either one engaged and the other free. This locking means comprises an ordinary bolt 42 adapted to engage in any one of a series of notches in a segment 43.

In operation, by moving the levers 41 selectively any desired pair of clutch elements may be engaged with one another, and by reason of the different gear ratios four forward transmission speeds are provided.

For steering the truck the front wheels 45 are provided with fixed transverse arms 46 pivoted as at 47 to the fixed front axle 48. These arms are formed on their inner ends with gear segments 49 which are engaged by a central arcuate gear rack 50 which is moved in a circular path by a worm pinion 51 meshing with worm gear teeth 52 thereon. This pinion 51 is fixed on the end of a transverse shaft 53 connected by bevel gears 54, 55 with a longitudinal shaft 56 on the rear end of which is a bevel gear 57 meshing with a like gear 58 on the lower end of a steering shaft 59 having a steering wheel 60 on its upper end.

Mounted on the truck are a number of air compressors 65 of the ordinary reciprocating type whose piston rods are connected to a crank shaft 66 on which is a bevel gear 67 meshed by a bevel pinion 68 on a stub shaft 69 on which is also fixed an ordinary sprocket wheel over which is looped a chain 70, this chain engaging also over a sprocket wheel rigid on a clutch member 71 rotatable but not axially movable on shaft 17. Feathered on shaft 17 is a clutch member 72 adapted to be moved by a hand lever 73 into engagement with the clutch member 71. When going down long inclines the clutch members 71, 72 may be inter-engaged, thus causing the compressors 65 to be driven by gravital action. A gear 75 may be fixed on the stub shaft 69 and may be engaged by a second gear 76 on which is a crank handle 77 so that by rotation thereof, in cases of emergency the tank 15 may be charged by hand.

Having thus described my invention what I claim as new and desire to protect by Letters Patent of the United States is as follows:

1. In a motor truck, a pair of rear wheels, an axle on which said wheels are fixed, a pair of gears of different diameters fixed on said axle one at each end thereof a pair of pinions located in front of said axle and meshing with the said gears, a motor, a pair of transverse shafts extending at the rear of said axle, pinions on said rear shafts meshing with the gears on the axle, drive connections between the motor and all of said pinions, clutch elements fixed to said pinions, and clutch elements on said drive connections adapted to engage said first named clutch elements.

2. In a motor truck, a pair of rear wheels, an axle on which said wheels are fixed, a pair of gears of different diameters fixed on said axle, one at each end thereof, a transverse shaft extending in front of said axle, a pair of short transverse shafts extending at the rear of said axles, a motor, drive connections between said motor and front transverse shaft and between the latter and the rear transverse shafts, pinions loose on said transverse shafts meshing with opposite sides of said gears, clutch elements fixed to said pinions, and clutch sleeves feathered on said transverse shafts and adapted to engage said clutch elements.

In testimony whereof I have affixed my signature.

LEON KORNELOW.